United States Patent Office 3,157,591
Patented Nov. 17, 1964

3,157,591
SILICA-ALUMINA-MAGNESIA CATALYST AND METHOD OF CONVERTING HYDROCARBONS
Richard Joseph De Feo, Baton Rouge, La., and Elroy M. Gladrow, Edison Township, Middlesex County, N.J., assignors to Esso Research and Engineering Company, a corporation of Delaware
No Drawing. Filed Dec. 4, 1961, Ser. No. 156,970
11 Claims. (Cl. 208—120)

This invention relates to the preparation and use of a highly active and selective silica-alumina-magnesia catalyst for the conversion of hydrocarbons.

With mixed oxide type cracking or conversion catalysts the desirable properties are (1) a high degree of dispersion of the minor components throughout the framework of the major component; (2) a high degree of acid strength and titer and high acid stability towards heat and/or steam; and (3) high surface area retention after heating and steaming.

It has been known for some time that high alumina silica-alumina catalysts containing 30 to 45 wt. percent alumina exhibit high activity but poor selectivity relative to silica-alumina catalysts containing 13% alumina in a cracking operation. These prior high alumina silica-alumina catalysts were all characterized by having crystalline alumina present in the structure. From work done it is believed that the crystalline alumina contributed to the high dry gas and coke selectivities of these prior preparations.

Silica-magnesia cracking catalyst containing about 30% wt. MgO and having sufficiently high pore volume and pore diameter is very active catalytically and gives low carbon or coke and gas make relative to the standard silica-alumina catalyst containing 13% alumina. However, the octane number of the gasoline is several numbers lower than that from the standard silica-alumina catalyst containing 13% alumina. The naphtha or gasoline and the dry gas produced with the silica-magnesia catalyst are generally more olefinic than those hydrocarbons produced when cracking with standard silica-alumina catalysts.

The present invention provides a process for making a silica-alumina-magnesia catalyst having high acid stability, substantially no crystals of any of the components of the catalyst and which has highly desirable cracking properties. The present invention provides a highly active three component cracking catalyst which combines high activity, good selectivity and higher naphtha yields with no loss in product quality. An unexpected result is the higher heating oil yield at the expense of the 650° F.+material.

Silica-alumina-magnesia catalysts are known and some of these catalysts give a high gasoline yield similar to conventional silica-magnesia catalyst relative to conventional silica-alumina catalyst, and an octane number intermediate between conventional silica-alumina catalyst and conventional silica-magnesia catalyst.

By the method of the present invention, a high alumina content can be incorporated into the silica structure along with magnesia to produce a superior high $Al_2O_3$ amorphous three component cracking catalyst. This superiority of the catalyst arises from its high acid stability and strength and its amorphous structure.

The surface acidity of the catalyst is very important and has been shown to explain the difference in the octane numbers of gasolines produced from the same feed stock using catalysts of different acid strength. Conventional 13% $Al_2O_3$ silica-alumina catalyst has its acid strength and titer degraded severely by heat and steam so that activity is lost rather rapidly in a continuous cracking operation. Commercial silica-magnesia has its acidity initially in a low acid strength range, and steaming degrades the total acid titer. It is apparent then that an improved silica-alumina-magnesia catalyst should have a higher acid stability while retaining acid strength when subjected to heat and/or steam.

Surface area of catalysts is an important property, as it represents to some degree the amount of available "space" to permit reactions to occur. Silica-alumina catalysts in general undergo a continual decrease in surface area when subjected to heat and steam. The rate of surface area decline decreases as the alumina content increases. This suggests then, that the $Al_2O_3$ content of three component catalysts should be high to obtain the added advantage of surface area stability as well as increased activity.

Therefore, to prepare a three component catalyst of silica-alumina-magnesia, it is necessary to (1) have complete dispersion of the $Al_2O_3$ in the catalyst composition, (2) have high $Al_2O_3$ content to take advantage of the increased surface area stability and activity, (3) have high acid strength and titer characteristic of silica-alumina catalysts, and good retention of these on steaming and heating, and (4) take advantage of the increased naphtha and heating oil yields which the magnesia present in the catalyst will promote.

By the method of the present invention, $$SiO_2\text{—}Al_2O_3\text{—}MgO$$

catalysts have been prepared which meet the above requirements. It has been found that a highly active three component catalyst can be made from silica hydrosol, hydrolyzing aluminum alcoholate therein to make a fine dispersion, and adding a suitable magnesium salt (or a slurry of finely divided magnesia) to this dispersion. The entire well dispersed mixture is then gelled, aged, and dried. The drying operation may be carried out in a forced draft oven or by means whereby the gel is converted to a pumpable slurry and spray dried. If the silica hydrosol employed is free of extraneous ions such as sodium, sulfate, and the like, no water washing procedure for the catalyst is required.

A catalyst prepared according to the present invention retains the high activity characteristic of high $Al_2O_3$ silica-alumina type catalysts, and gives higher yields of naphtha with no loss in product octane number or quality. The coke and gas production are particularly low for the high activity obtained. The catalyst has the requisite absence of crystalline alumina, high acid titer and strength, and high stability to steam and heat degradation.

The catalyst of the present invention may contain up to 40% by wt. of alumina and up to 15 wt. percent magnesia, but the preferred range is about 25–35 wt. percent of alumina and about 3–10 wt. percent of magnesia and the rest silica. The catalyst of the present invention can have a composition in the ranges as follows:

| | Wt. Percent |
|---|---|
| $SiO_2$ | 45–78 |
| $Al_2O_3$ | 20–40 |
| $MgO$ | 2–15 | with the preferred ranges being as follows:

| | |
|---|---|
| $SiO_2$ | 55–72 |
| $Al_2O_3$ | 25–35 |
| $MgO$ | 3–10 |

Examples are given below of the preparation of commercial silica-alumina catalyst and commercial silica-magnesia catalyst and these are compared with silica-alumina-magnesia of the present invention.

With the present invention silica-alumina catalysts are prepared having between 20 and 40 wt. percent $Al_2O_3$ incorporated with 3 to 10 wt. percent MgO and the rest silica without creating crystalline $Al_2O_3$ in the catalyst as shown by X-ray diffraction. The method of the present invention is the best one known for incorporating up to 40 wt. percent $Al_2O_3$ without creating crystalline $Al_2O_3$. Catalysts with 1 wt. percent MgO and 15 wt. percent MgO in the three component catalyst have been found to be less active than 3–10 wt. percent MgO three component catalyst and these set the outer limits of MgO content.

EXAMPLE 1

The catalyst of the present invention is prepared by hydrolyzing aluminum alcoholate in a freshly prepared ammoniacal silica hydrosol and adding to this a magnesium salt of an organic acid and then gelling the well dispersed mixture. More particularly, 4,000 cc. of a 3 wt. percent silica hydrosol freshly prepared by passing a solution of commercial sodium silicate ($Na_2O \cdot 3.22SiO_2$) of strength equivalent to 30 g. $SiO_2$/liter through a bed of hydrogen form cation exchange resin are admixed with 20 cc. of concentrated $NH_4OH$ to make an alkaline sol. To this are added, with good stirring, 805 cc. of a solution of aluminum amylate (equivalent to 87 g. $Al_2O_3$/liter) in a mixed amyl alcohol-hydrocarbon solvent.

The resulting finely divided dispersion of alumina hydrate in the silica sol is continually stirred while adding 250 cc. of a solution comprising 53.3 g. magnesium acetate ($Mg(C_2H_3O_2)_2 \cdot 4H_2O$) and 7.5 cc. glacial acetic acid. This brings the fine dispersion to about a pH 7, and the mixture sets within about one minute to a clear hydrogel. The resulting gel is aged for about 48 hours at room temperature, and then dried in a forced draft oven at 300° F. No water washing step is required. The dried gel is crushed to give a coarse, granular powder, principally in the 12–50 mesh size region and then calcined at 1000° F. for 16 hours. This material comprises about 60% $SiO_2$–35% $Al_2O_3$–5% MgO and is designated catalyst "A." A portion of catalyst "A" was steamed at 1050° F. and 0 p.s.i.g. for 16 hours. Both the fresh calcined and steamed portions of catalyst "A" were completely amorphous as determined by X-ray analysis. Surface properties as determined by nitrogen adsorption by the BET method show a surface area of 388 m.²/g. and a pore volume 0.36 cc./g. for calcined catalyst "A," whereas the steamed catalyst "A" gave values of 275 m.²/g. for surface area and 0.42 cc./g. for pore volume.

Catalyst "A" is compared in subsequent examples with catalysts "B" and "C" which are identified as follows:

*Catalyst "B"*.—This catalyst is a commercially available material comprising 13% $Al_2O_3$ and 87% by wt. $SiO_2$. It is believed to be made by preparing a pumpable slurry of sodium silicate at pH 7, impregnating with an alum solution, and then addding ammonium hydroxide to precipitate alumina. The resulting slurry is then spray dried. The dried microspheres are water washed to remove soda and sulfate and again dried. The washed and dried microspheres are then calcined by heating at atmospheric pressure at a temperature of about 1000° F. for about 24 hours. A portion of catalyst "B" was subjected to an atmosphere of steam at about 1050° F., 0 p.s.i.g. for about 24 hours.

*Catalyst "C"*.—This catalyst which contains silica and magnesia is commercially available and is believed to be prepared by mixing sodium silicate solution with excess sulfuric acid to form an acidic silica hydrosol at a pH less than 3. Magnesia as finely divided solid particles is slurried in water and added to the acidic silica hydrosol maintained at a temperature of about 40–75° F. Rapid stirring is employed throughout. Gelation occurs within seconds after an induction period of from several minutes to several hours, depending on temperature and concentration of the mixture. Catalyst "C" comprises 70% $SiO_2$–30% MgO by weight. A portion of catalyst "C" was subjected to an atmosphere of steam at about 1050° F., 0 p.s.i.g. for about 24 hours.

The surface acidity of catalysts "A," "B" and "C" was determined by titrating with butyl amine in non-aqueous systems employing Hammett type indicators. The acid titer data are summarized in Table 1.

Table 1

| Acid Strength, Percent $H_2SO_4$ Equiv. Catalyst | Acid Titer, meq./g. | | | | |
|---|---|---|---|---|---|
| | <48 | 48–71 | 71–91 | 91 | Total |
| B, fresh | 0.00 | 0.03 | 0.05 | 0.28 | 0.36 |
| B, steamed | 0.01 | 0.06 | 0.01 | 0.00 | 0.08 |
| C, fresh | 0.74 | 0.02 | 0.00 | 0.00 | 0.76 |
| C, steamed | 0.14 | 0.02 | 0.00 | 0.00 | 0.16 |
| A, steamed | 0.00 | 0.00 | 0.00 | 0.30 | 0.30 |

These data point out the high acid strength of fresh catalyst "B," which is severely degraded in total titer and strength on steaming. Catalyst "C" ($SiO_2$–MgO) has high acid titer and low acid strength fresh, and this is severely degraded in total titer on steaming. Catalyst "A" of the present invention maintains high acid strength and total titer on steaming. This shows much improved steam stability.

The surface areas of catalysts "B" and "A" were determined by the BET method using nitrogen adsorption, both for the fresh catalysts after calcining, and for the steam deactivated catalysts treated at 1050° F., steam at 0 p.s.i.g. for 24 hours.

The proportionate amount of the original surface areas retained after steaming for each catalyst is listed below in Table 2.

Table 2

Percent original surface area retained
Catalyst B _____ 45
Catalyst A _____ 71

From these data it will be seen that catalyst "A" of the present invention has improved stability to surface area loss.

EXAMPLE 2

Catalysts "B" and "A" after steaming as described in connection with Table 2 were tested in a cracking operation at 900° F., atmospheric pressure, and a 10 minute cycle using pure cetane feed. The following results were obtained.

Table 3

| | Catalyst B | Catalyst A |
|---|---|---|
| Conversion, wt. percent | 30 | 30 |
| W./hr./w | 4.0 | 5.3 |

These data show that catalyst "A" of the present invention has a higher activity as shown by the higher flow rate (weight of oil per hour per weight of catalyst) employed to get the same conversion, than a standard commercial silica-alumina catalyst containing 13% $Al_2O_3$ by weight.

In the cracking test using cetane feed (Table 3) the following selectivity improvement for catalyst "A" was obtained.

Table 4

| | Catalyst B | Catalyst A |
|---|---|---|
| Conversion, wt. percent | 30 | 30 |
| $C_3$ (minus) production, wt. percent | 5.3 | 4.3 |
| $C_5$ (plus) production, wt. percent | 13.8 | 14.7 |

Thus the catalyst of the present invention "A" gives not only improved activity but also improved naphtha production at the expense of light gas.

EXAMPLE 3

Catalyst A of the present invention was compared further in a cracking test with catalyst "D." Catalyst D is a commercially available catalyst prepared in a manner similar to catalyst "B" but containing 25% $Al_2O_3$ and 75% $SiO_2$ by weight. Catalyst "D" was steam deactivated at about 1050° F., 0 p.s.i.g. for 16 hours.

Samples of catalyst "A" and catalyst "D" were pilled to a pill density of about 0.7, and were tested in a fixed bed cracking test at 950° F., 2 v./v./hr., 30 minute cycle, using an East Texas light gas oil feed. The following results were obtained.

Table 5

|  | Catalyst A | Catalyst D |
|---|---|---|
|  | 35% $Al_2O_3$–5% MgO–60% $SiO_2$ | 25% $Al_2O_3$–75% $SiO_2$ |
| 430° F. Conversion at 2 v./v./hr. | 56.2 | 50.0 |
| Selectivity Data: |  |  |
| Conversion | 55 | 55 |
| Light gas make, wt. percent | 18.5 | 20.5 |
| Naphtha make, wt. percent | 33.5 | 31 |
| Carbon on Catalyst, wt. percent | 3.3 | 3.5 |
| Research Octane Number (+3 cc. lead) | 101.2 | 100.7 |

Therefore, again, the selectivity and activity advantage of the catalyst of the present invention is apparent. At the same conversion, catalyst "A" gives lower gas and carbon production, with increased naphtha make than the 25% $Al_2O_3$ silica-alumina catalyst presently in use in some commercial cracking units.

EXAMPLE 4

Samples of catalyst "A" and "D" were compared with catalyst "E" which was prepared in the same manner as catalyst "A" but without adding magnesia (MgO). Catalyst "E" consisted of 35 wt. percent $Al_2O_3$ and 65 wt. percent $SiO_2$. Portions of catalysts "A," "D" and "E" were steamed at 1400° F. for 16 hours at 0 p.s.i.g. These catalysts were then tested in a fluid bed test with a gas oil feed having an initial boiling point above 650° F. Results are given in the following Table 6 using the 25% $Al_2O_3$ catalyst "D" as the basis for comparison.

Table 6

| Catalyst | A | D | E |
|---|---|---|---|
|  | Present Invention 35 $Al_2O_3$–5 MgO–7560 $SiO_2$ | Commercial 25 $Al_2O_3$–75 $SiO_2$ | Prepared 35 $Al_2O_3$–7565 $SiO_2$ |
| Product Selectivity (all data based on 100% correlation for the standard 25% $Al_2O_3$) (Cat. D): |  |  |  |
| Carbon | 86 | 100 | 94 |
| $C_4$, gas | 90 | 100 | 89 |
| $C_5$, 430° Naphtha | 106 | 100 | 106 |
| 430–650° Gas Oil | 114 | 100 | 102 |
| Res. Octane No. +3 cc. TEL | 98.9 | 98.9 | 98.8 |
| Motor Octane No. +3 cc. TEL | 87.3 | 87.0 | 85.1 |

The data in Table 6 show the increased yield of gasoline and gas oil produced by using catalyst "A" of the present invention over the standard commercial silica-alumina catalyst containing 25% $Al_2O_3$ (catalyst "D") and over a high alumina silica-alumina catalyst containing 35% $Al_2O_3$ (catalyst "E") made in a manner similar to catalyst "A" but omitting the MgO. It is especially interesting to note the high yield of gas oil which favors the catalyst of the present invention in cases or in seasons when less gasoline and more gas oil are desired products. Catalyst "A" of the present invention is equivalent to catalysts "D" and "E" in regard to research octane number of the gasoline and may be even superior to "D" and "E" in motor octane number of the gasoline.

EXAMPLE 5

Additional cracking tests were carried out comparing catalyst "A" of the present invention with other catalysts and these data are given in Table 7. The tests were carried out in a reaction employing a fluid bed of catalyst with a virgin process gas oil feed at 950° F., 10 minute cycle. All the catalysts were steamed at 1400° F. 0 p.s.i.g. for 16 hours before testing. The catalysts are shown in Table 7 as containing a certain percentage of $Al_2O_3$ or $Al_2O_3$ and MgO and the rest is silica. All of the "Prepared Catalysts," with the exception of that catalyst comprising 1% MgO, were made from silica hydrosol plus aluminum alcoholate and where magnesia is included, magnesia acetate was used. The catalyst in Table 7 containing 1% MgO (last column) was prepared as follows.

EXAMPLE 6

Silica hydrosol was prepared by contacting a sodium silicate solution with a hydrogen form cation exchange resin. The 3 wt. percent $SiO_2$ hydrosol was used as freshly prepared and about 1970 cc. of the silica hydrosol was mixed with 10 ml. of concentrated $NH_4OH$ to give a pH of about 11.0. The hydrosol was warmed to about 110° F. and aluminum amylate solution (described in Example 1) was added in sufficient amount to form a slurry of silica-alumina particles of the desired composition.

About 1 g. MgO powder was slurried in about 250 cc. water and added with rapid stirring, to the silica-alumina slurry before gel formation started. Glacial acetic acid was added to bring the pH to 7.0 to form a gel which formed within seconds. The gel was aged for 48 hours at room temperature and then dried in a forced draft oven at 300° F. for 24 hours, followed by calcination at 1000° F. for 16 hours.

The catalyst consisted of 59 wt. percent $SiO_2$, 40 wt. percent $Al_2O_3$ and 1 wt. percent MgO. No crystalline alumina was found in the structure upon X-ray diffraction analysis.

The catalyst had a surface area of 504 m.$^2$/g. and a pore volume of 0.50 cc./g. A portion of the catalyst was steamed 16 hours at 1050° F. and 0 p.s.i.g. pressure to bring the surface area to 369 m.$^2$/g. and the pore volume to 0.49 cc./g.

Table 7

| Catalyst | Commercial | Prepared | | | |
|---|---|---|---|---|---|
|  | 25% $Al_2O_3$ | 35% $Al_2O_3$ | 40% $Al_2O_3$ | 35% $Al_2O_3$ 5% MgO ("A") | 40% $Al_2O_3$ 1% MgO |
| Relative Activity | 1.0 | 2.0 | 2.4 | 1.5 | 2.8 |
| Product Distribution at 60% Conversion: |  |  |  |  |  |
| Carbon, wt. percent | 3.1 | 2.9 | 2.8 | 2.5 | 3.1 |
| $C_4$ minus, Gas, wt. percent | 20.0 | 17.7 | 17.6 | 18.1 | 17.7 |
| $H_2$, s.c.f./b | 52 | 55 | 30 | 45 | 47 |
| $C_3$ minus, Sats., s.c.f./b | 184 | 175 | 155 | 193 | 186 |
| $C_2H_4$, s.c.f./b | 30 | 25 | 25 | 31 | 27 |
| $C_3H_6$, s.c.f./b | 119 | 99 | 100 | 101 | 99 |
| $C_4H_{10}$, wt. percent | 3.9 | 3.7 | 4.1 | 3.9 | 3.6 |
| $C_4H_8$, wt. percent | 7.2 | 6.1 | 5.7 | 6.0 | 5.9 |
| $C_5$, 430° F., wt. percent | 36.9 | 39.4 | 39.6 | 39.4 | 39.2 |
| 430–650° F., wt. percent | 21.0 | 21.4 | 20.1 | 24.2 | 21.9 |
| 650° F.+, wt. percent | 19.0 | 18.6 | 19.9 | 15.8 | 18.1 |
| Material Balance, wt. percent | 98.3 | 98.0 | 99.7 | 97.6 | 98.1 |
| Number of Workups | 3 | 3 | 2 | 2 | 2 |
| Product Quality: |  |  |  |  |  |
| $C_5$, 430° F.: |  |  |  |  |  |
| Research Octane No. +3 cc. | 99.9 | 99.3 | 99.3 | 99.3 | 99.0 |
| Motor Octane No. +3 cc. | 84.6 | 84.6 | 86.1 | 88.8 | 85.6 |
| 430–650° F.: Diesel Index | 13.4 | 16.5 | 16.6 | 18.6 | 15.9 |

These data in Table 7 show activity and selectivity advantages for catalyst "A." The data show lower carbon or coke make, less dry gas ($C_4$ minus), more gasoline and unexpectedly show more heating oil (430–650° F.) at the expense of the 650° F.+ material. The yield of heating oil is much greater for catalyst "A" than from any of the other catalysts, especially those having no magnesia. The heating oil is also more paraffinic than that made by using the other catalysts as is apparent from the Diesel Index.

The data also show that 1% by wt. of MgO is not sufficient to give the catalyst the selectivity advantages.

The data further show that while 35% and 40% by wt. of $Al_2O_3$ silica-alumina catalysts are better than the commercial 25% $Al_2O_3$ silica-alumina catalyst, they are not as good as the three component catalyst of the present invention.

EXAMPLE 7

Catalyst "A" of this invention and catalyst "E" were employed in a cracking operation using East Texas gas oil at 950° F. on a 30 minute cycle. The catalysts were steamed at 1050° F., 0 p.s.i.g. for 16 hours before use.

*Table 8*

| Catalyst | "E" | "A" |
|---|---|---|
|  | 35% $Al_2O_3$ 65% $SiO_2$ | 35% $Al_2O_3$ 60% $SiO_2$ 5% MgO |
| Pore Volume cc./g | 0.38 | 0.43 |
| V./v./hr | 2 | 2 |
| Conversion | 58.5 | 56.2 |
| Product Distribution (wt. percent on feed): |  |  |
| $C_4$ minus | 22.4 | 21.1 |
| $C_5$ 430° F. Naphtha | 31.1 | 31.6 |
| Research Octane No. +3 cc. TEL | 101.1 | 101.0 |
| Carbon | 4.9 | 3.5 |

The above data show that the three component catalyst produces less gas, more gasoline and much less coke or carbon than the high alumina silica-alumina catalyst "E."

Catalyst made by the process of the present invention has been regenerated by burning the coke off of the catalyst with air at a temperature of about 1000° F. After regeneration the catalyst was restored substantially to its original activity. In some instances the catalyst has been regenerated over 10 times without substantially affecting the activity.

Instead of using aluminum amylate other aluminum alcoholates such as the alcoholates of the $C_1$–$C_8$ alcohols may be used. Instead of adding magnesium acetate to the silica-alumina slurry, magnesium nitrate or magnesium salts of other organic acids such as the citrate, tartrate, etc. may be used. The magnesium salt is one selected which leaves no residue which will require washing of the finished catalyst. However, $MgSO_4$ and $MgCl_2$, and others may be used but their use would require an additional step of washing.

The preferred proportions of the catalyst components may be between about 55 and 72 wt. percent $SiO_2$, 25 and 35 wt. percent $Al_2O_3$ and 3 and 10 wt. percent MgO.

The catalyst containing 1% MgO gives the lower limit. A catalyst has been prepared with 15% MgO–25% $Al_2O_3$–60% $SiO_2$ by the preferred method. In cetane cracking tests, as in Table 4, the catalyst gave poorer selectivity as follows.

At 30% conversion, $C_3$ minus yield was 5.3% and the $C_5$+ was 13% by weight, which are about the same yields obtained with the standard commercial 13% $Al_2O_3$ silica-alumina catalyst. Thus, with 15% MgO in the formulation of the catalyst of the present invention, the advantages of the new catalyst disappear and hence we place 15% MgO as an upper limit. Catalysts comprising 3–7% MgO in the high alumina composite catalyst have the same high qualities as the 5% MgO catalyst "A."

The temperature during cracking or conversion of the hydrocarbons may be between about 850° F. and 1000° F., the w./hr./w. may be between about 0.1 and 10, the catalyst to oil weight ratio may be between about 0.1 and 10. When using a fluidized solids technique the catalyst has a size preferably mostly between about 10 and 80 microns and the velocity of the fluidizing vapors or gases is between about 0.5 and 5.0 ft./sec. The temperature of regeneration of the spent catalyst may be between about 900 and 1100° F. The pressure in the reactor and regenerator is preferably slightly above atmospheric but may be between about 0 p.s.i.g. and 50 p.s.i.g. When using a fixed bed of catalyst the v./hr./v. may be between about 0.1 and 10.

The pH of the initial silica hydrosol before hydrolysis with aluminum alcohol may be between about 3 and 11. The temperature of the silica hydrosol before hydrolysis with aluminum alcoholate may be between room temperature and 120° F. The adjusted pH of the silica-alumina-magnesia mixture to be gelled is between about 5.0 and 9.0 and the adjusted pH of the gel before drying is preferably between 6 and 8.

After gelation of the $SiO_2$–$Al_2O_3$–MgO mixture the gel as a mass is aged and this aging may be between 16 and 72 hours or longer at room temperature or at a temperature between about 60° F. and 100° F. The drying of the aged gel in a forced draft oven may be between about 212° F. and 300° F. for between about 16 and 48 hours. When spray drying the aged gel higher temperatures are employed. In a downflowing spray dryer temperature at the top of the tower may be in the range of 350–600° F. while at the bottom of the tower the temperature is in the range of 200–350° F. The calcination of the dried catalyst may be at a temperature between about 850° F. and 1200° F. for 12 to 24 hours at atmospheric pressure or at a pressure between about 0 and 50 p.s.i.g. In the steam deactivation step, catalyst may be steamed at a temperature between about 950° F. and 1200° F. for 4 to 24 hours at atmospheric pressure or at a pressure between about 0 and 60 p.s.i.g., depending on time and temperature of the treatment.

Additional work has been carried out on the catalyst of the present invention to compare its resistance to metal contamination. The results of this work show that the catalyst made according to the present invention is much more resistant to metal contamination than commercially available silica-alumina catalyst containing 25% alumina.

In the catalytic cracking of hydrocarbon oils such as gas oil it is known that metals or metal compounds of nickel, vanadium etc. are deposited on the silica-alumina catalyst and contaminate the catalyst with the result that more coke, more gas and less gasoline are formed during the cracking than when using a catalyst not so contaminated.

Catalyst "D" was compared with catalyst "A" to determine the relative resistance to metal contamination. Each of the catalysts "A" and "D" received 47 cracking-regeneration cycles with a heavy vacuum gas oil of high nickel content of about 0.0002% by weight. This placed about 0.016–0.018 wt. percent of nickel on each catalyst. While the cracking-regeneration cycles were carried out in a small unit, the nickel was laid down on each catalyst under actual cracking conditions.

Using commercial catalyst "D" both fresh and contaminated as the basis of 100% and comparing the catalyst "A" therewith both on a fresh and contaminated basis, the following results were obtained as reported in Table 9.

*Table 9*

| Catalyst | A | |
|---|---|---|
|  | Fresh | Contaminated |
| Carbon | 91 | 86 |
| $C_4$ minus, gas | 94 | 86 |
| $C_5$, 430° F | 106 | 113 |

These data show, for example, that comparing the contaminated catalyst of the present invention, catalyst "A," with the commercial catalyst "D" only about 86% of the carbon or coke is made, only about 86% of the $C_4$ minus gas is made and 113% or more gasoline is made.

What is claimed is:

1. A method of preparing a silica-alumina-magnesia catalyst containing about 2 to 12 wt. percent MgO, about 20 to 40 wt. percent $Al_2O_3$ and up to about 73 wt. percent $SiO_2$ which comprises preparing a silica hydrosol made by treating an alkali metal silicate solution with a cation exchange material, hydrolyzing an aluminum alcoholate with the silica hydrosol to form a dispersion or slurry of silica-alumina hydrogel particles, adding a magnesium compound to said slurry, mixing said slurry, adjusting the pH of said slurry to about 7.0, gelling the slurry, aging the gel particles and then drying the gel particles.

2. A method according to claim 1 wherein the magnesium compound comprises an acetate.

3. A method according to claim 1 wherein the magnesium compound is added as MgO.

4. A method according to claim 1 wherein the catalyst consists essentially of 35 wt. percent $Al_2O_3$–5 wt. percent MgO–60 wt. percent $SiO_2$.

5. A process according to claim 1 where ammonium hydroxide is added to the silica hydrosol to produce an ammoniacal silica hydrosol.

6. A method of cracking higher boiling hydrocarbons to produce increased yields of naphtha and heating oil and decreased yields of gas, coke and 650° F.+ material which comprises contacting high boiling hydrocarbons at a conversion temperature with a silica-alumina-magnesia catalyst containing between about 20 and 40 wt. percent $Al_2O_3$ and between about 2 and 10 wt. percent MgO and the rest $SiO_2$ made by mixing silica hydrosol made by treating an alkali metal silicate solution with a cation exchange material with aluminum alcoholate to form a slurry of silica and alumina, adding a magnesium compound, adjusting the pH of said slurry to about 7.0 and then gelling the mixture, aging the gelled material for about 24 to 72 hours at room temperature and then drying the aged mixture.

7. A method according to claim 6 wherein the catalyst consists essentially of 5% MgO–35% $Al_2O_3$–60% $SiO_2$ by weight.

8. A method according to claim 1 wherein said silica hydrosol is an alkaline silica hydrosol.

9. A method of cracking higher boiling hydrocarbons to lower boiling hydrocarbons including naphtha which comprises contacting high boiling hydrocarbons at a conversion temperature with a silica-alumina-magnesia catalyst containing between about 20 and 40 wt. percent $Al_2O_3$, between about 2 and 10 wt. percent MgO, and the rest $SiO_2$, made by mixing silica hydrosol prepared by contacting an alkali silicate solution with a cation exchange material with aluminum alcoholate to form a slurry of silica and alumina, adding a magnesium compound, gelling the resulting mixture and then drying the gelled mixture.

10. A method according to claim 9 wherein the catalyst consists essentially of 5% MgO–35% $Al_2O_3$–60% $SiO_2$ by weight.

11. A method according to claim 9 wherein increased yields of naphtha and heating oil and decreased yields of gas, coke and 650° F.+ material are obtained and the magnesium compound is added as magnesium acetate.

References Cited in the file of this patent

UNITED STATES PATENTS

| | | |
|---|---|---|
| 2,636,865 | Kimberlin et al. | Apr. 28, 1953 |
| 2,886,511 | Van Dyke et al. | May 12, 1959 |
| 2,958,648 | Braithwaite | Nov. 1, 1960 |
| 3,041,270 | Leum et al. | June 26, 1962 |
| 3,066,092 | Winyall | Nov. 27, 1962 |